(12) United States Patent
Hennig

(10) Patent No.: US 9,908,373 B2
(45) Date of Patent: Mar. 6, 2018

(54) ROTARY AIR CONNECTION WITH CENTRAL VALVE FOR TIRE INFLATION SYSTEM

(75) Inventor: Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 424 days.

(21) Appl. No.: 13/704,834

(22) PCT Filed: Jun. 21, 2011

(86) PCT No.: PCT/US2011/041305
§ 371 (c)(1),
(2), (4) Date: Dec. 17, 2012

(87) PCT Pub. No.: WO2011/163274
PCT Pub. Date: Dec. 29, 2011

(65) Prior Publication Data
US 2013/0087262 A1   Apr. 11, 2013

Related U.S. Application Data

(60) Provisional application No. 61/356,947, filed on Jun. 21, 2010.

(51) Int. Cl.
*B60C 23/00*   (2006.01)

(52) U.S. Cl.
CPC ............ *B60C 23/003* (2013.01); *B60C 23/00* (2013.01)

(58) Field of Classification Search
CPC ..... B60C 23/00; B60C 23/003; B60C 23/001; B60C 23/002; B60C 23/007; B60C 23/008; B60C 23/009

USPC .......................... 152/417, 415, 416
See application file for complete search history.

(56) References Cited

U.S. PATENT DOCUMENTS

| 1,072,907 A | 9/1913 | Brooks |
| 1,083,847 A | 1/1914 | McDowell et al. |
| 1,112,596 A | 10/1914 | Burggraf, Jr. |
| 1,165,057 A | 12/1915 | Bayly |
| 1,205,504 A | 11/1916 | Bearce |

(Continued)

FOREIGN PATENT DOCUMENTS

| EP | 0480855 A1 | 4/1992 |
| JP | H0642308 U | 6/1994 |

(Continued)

OTHER PUBLICATIONS

International Preliminary Report on Patentability issued in corresponding PCT App. Serial No. PCT/US2011/041305 dated Feb. 20, 2014 (5 pages).

(Continued)

*Primary Examiner* — Jason R Bellinger
(74) *Attorney, Agent, or Firm* — Pizarro Allen PC

(57) ABSTRACT

A rotary air connection for an automatic tire inflation system having an air pressure source, the rotary air connection comprising a stationary portion and a rotatable portion rotatably mounted to the stationary portion, the rotary air connection having a central channel with a one-way check valve disposed in the central channel so as to allow fluid to flow from the air pressure source in one direction through the central channel but not in the opposite direction toward the air pressure source.

19 Claims, 10 Drawing Sheets

(56) References Cited

U.S. PATENT DOCUMENTS

| | | | |
|---|---|---|---|
| 1,800,780 A | 4/1931 | Daneel | |
| 2,107,405 A * | 2/1938 | Williams | B60C 23/003 |
| | | | 152/417 |
| 2,177,042 A * | 10/1939 | Michael | B60C 23/003 |
| | | | 152/416 |
| 2,685,906 A * | 8/1954 | Williams | B60C 23/001 |
| | | | 137/224 |
| 2,854,018 A | 9/1958 | Kilmarx, Jr. | |
| 3,276,503 A | 10/1966 | Kilmarx | |
| 4,387,931 A | 6/1983 | Bland | |
| 4,685,501 A | 8/1987 | Williams | |
| 4,700,763 A * | 10/1987 | Williams | B60C 23/003 |
| | | | 137/522 |
| 4,883,106 A | 11/1989 | Schultz et al. | |
| 5,287,906 A * | 2/1994 | Stech | B60C 23/007 |
| | | | 152/417 |
| 5,377,736 A | 1/1995 | Stech | |
| 5,584,949 A | 12/1996 | Ingram | |
| 5,694,969 A | 12/1997 | DeVuyst | |
| 5,707,186 A * | 1/1998 | Gobell | B23B 31/302 |
| | | | 137/580 |
| 5,769,979 A * | 6/1998 | Naedler | 152/417 |
| 5,868,881 A | 2/1999 | Bradley | |
| 2,947,172 A | 9/1999 | Glotin | |
| 6,105,645 A * | 8/2000 | Ingram | 152/415 |
| 6,131,631 A | 10/2000 | Bradley | |
| 6,145,559 A | 11/2000 | Ingram, II | |
| 6,167,900 B1 | 1/2001 | Laird | |
| 6,325,124 B1 | 12/2001 | Colussi et al. | |
| 6,394,556 B1 | 5/2002 | Ingram | |
| 6,425,427 B1 * | 7/2002 | Stech | 152/417 |
| 6,435,238 B1 | 8/2002 | Hennig et al. | |
| 6,585,019 B1 * | 7/2003 | Ingram | 152/417 |
| 6,698,482 B2 | 3/2004 | Hennig et al. | |
| 6,772,812 B1 | 8/2004 | Hamilton | |
| 6,938,658 B2 | 9/2005 | Jarrett et al. | |
| 7,191,796 B1 | 3/2007 | Rehmert, Jr. | |
| 7,273,082 B2 | 9/2007 | White et al. | |
| 7,404,412 B2 | 7/2008 | Milanovich et al. | |
| 7,418,989 B2 * | 9/2008 | Ingram | 152/417 |
| 7,690,412 B1 | 4/2010 | Jenkinson et al. | |
| 7,896,045 B2 * | 3/2011 | Solie et al. | 152/417 |
| 7,992,610 B2 * | 8/2011 | Collet et al. | 152/417 |
| 8,191,594 B2 * | 6/2012 | Saadat | 152/417 |
| 8,910,683 B2 * | 12/2014 | Hennig | B60T 5/00 |
| | | | 152/415 |
| 9,346,330 B2 * | 5/2016 | Musgrave | B60S 5/043 |
| 2004/0000364 A1 | 1/2004 | Hennig et al. | |
| 2004/0173296 A1 | 9/2004 | White et al. | |
| 2007/0227640 A1 | 10/2007 | Ingram | |
| 2008/0185086 A1 | 8/2008 | Ingram et al. | |
| 2009/0283190 A1 * | 11/2009 | Padula et al. | 152/417 |

FOREIGN PATENT DOCUMENTS

| | | |
|---|---|---|
| WO | WO9958353 A1 | 11/1999 |
| WO | WO2011/163274 | 12/2011 |
| WO | WO2012027335 | 3/2012 |

OTHER PUBLICATIONS

International Search Report and Written Opinion issued in corresponding PCT Patent App. No. PCT/US11/48760 dated Feb. 26, 2013 (10 pages).

International Preliminary Report on Patentability issued in corresponding PCT Patent App. No. PCT/US11/48760 dated Feb. 2, 2012 (9 pages).

International Search Report and Written Opinion issued in corresponding PCT Pat. App. No. PCT/US11/41305 dated Oct. 7, 2011 (7 pages).

Extended European Search Report issued in counterpart European Application No. 11798779.2 dated Mar. 30, 2017 (6 pages).

Google Patents machine translation of European Patent Publication No. EP0480855A1 cited in Extended European Search Report issued in counterpart European Application No. 11798779.2 dated Mar. 30, 2017 (13 pages).

Google Patents machine translation of Japanese Patent Publication No. JPH0642308U cited in Extended European Search Report issued in counterpart European Application No. 11798779.2 dated Mar. 30, 2017 (7 pages).

* cited by examiner

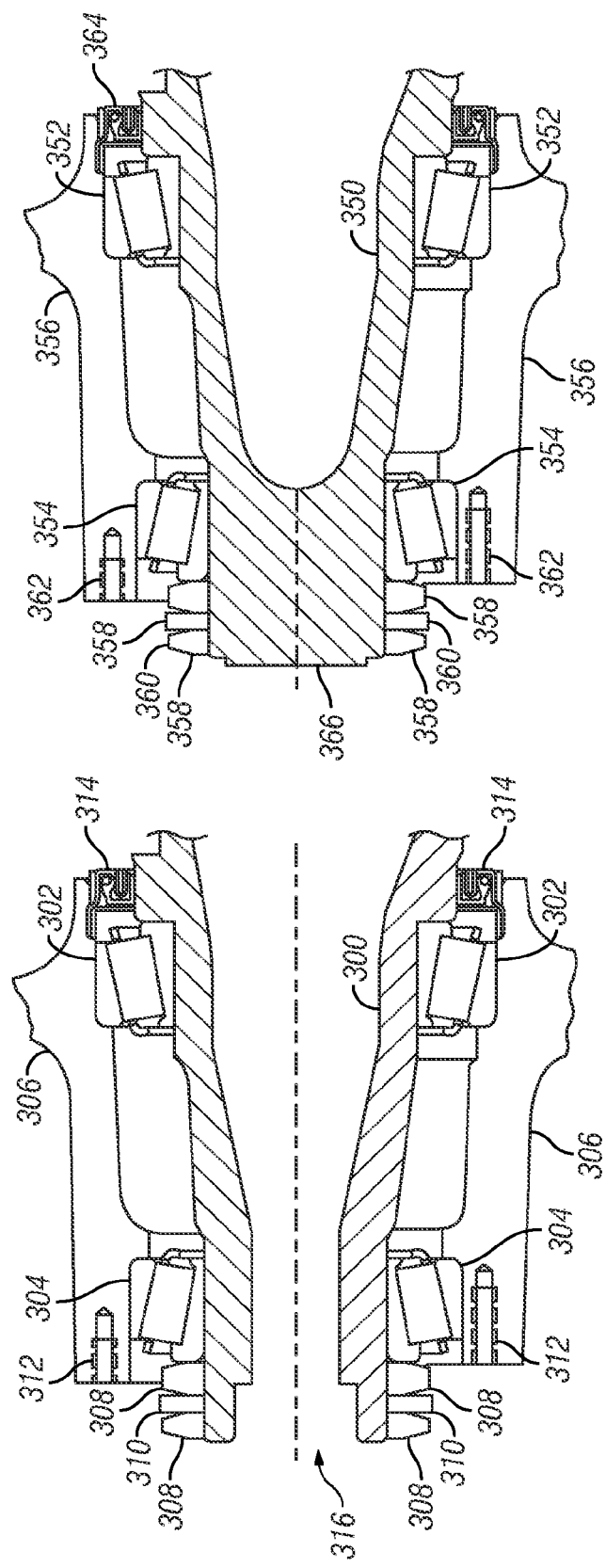

ROTARY AIR CONNECTION WITH CENTRAL VALVE FOR TIRE INFLATION SYSTEM

CROSS-REFERENCE TO RELATED APPLICATION

This application claims priority to U.S. Provisional Patent Application No. 61/356,947, entitled "Rotary Air Connection with Valve for Tire Inflation System" filed Jun. 2010, which is hereby entirely incorporated by reference.

FIELD

The disclosed apparatus generally relates to vehicle automatic tire inflation stems.

BACKGROUND

Automatic tire inflation systems may be used to control vehicle tire pressure by adding or releasing air from the vehicle's tires. Automatic tire inflation systems may provide pressurized air from a pressurized air source to the vehicle's tires to maintain tire pressure at a desired pressure level whether the tires are stationary and rotating. Automatic tire inflation systems may use a variety of regulators, air conduits and rotary air connections to provide pressurized air to the tires. Automatic tire inflation systems may also use one or more valves to control the direction, speed and volume of air flow. There exists a need for a valve arrangement to better control air flow.

SUMMARY

In an embodiment, a rotary air connection for an automatic tire inflation system, the automatic tire inflation system having an air pressure source, and the rotary air connection may comprise a stationary portion having a first channel therein; a rotatable portion rotatably mounted to the stationary portion, the rotatable portion having a second channel therein in fluid communication with the first channel, the first channel and second channel together forming a central channel; and a one-way check valve disposed in the central channel so as to allow fluid to flow from the air pressure source in one direction through the central channel but not in the opposite direction toward the air pressure source. The one-way check valve may be disposed in one of the first channel of the stationary portion and the second channel of the rotatable portion.

In one embodiment, the stationary portion may comprise a stator and the rotatable portion may comprises a tee body, and the stator and tee body may be in fluid communication through a rotatable tube, and the first channel of the stator, the tube and the second channel of the tee body together may form the central channel. A one-way check valve may be disposed in one of the first channel of the stator, the tube and the second channel of the tee body.

In another embodiment, the stationary portion may comprise a shaft, and the rotatable portion may comprise a hubcap, the first channel of the shaft and the second channel of the hubcap together may form the central channel. A one-way check valve may be disposed in one of the first channel of the shaft and the second channel of the hubcap.

In yet another embodiment, the stationary portion may comprise a shaft, and the rotatable portion may comprise a housing having a graphite element disposed therein, the graphite element being urged against the shaft to form a face seal, and the first channel of the shaft and the second channel of the graphite element together may form the central channel. A one-way check valve may be disposed in one of the first channel of the shaft and the second channel of the graphite element.

In a further embodiment, the stationary portion may comprise a stator and the rotatable portion may comprise a tube having a tee body, and the first channel of the stator and the second channel of the tube and tee body together may form the central channel. A one-way check valve may be disposed in one of the first channel of the stator and the second channel of the tube and tee body.

BRIEF DESCRIPTION OF THE DRAWINGS

FIGS. 3A and 3B illustrate embodiments of hollow and solid axle spindles.

DETAILED DESCRIPTION

Figure 1:
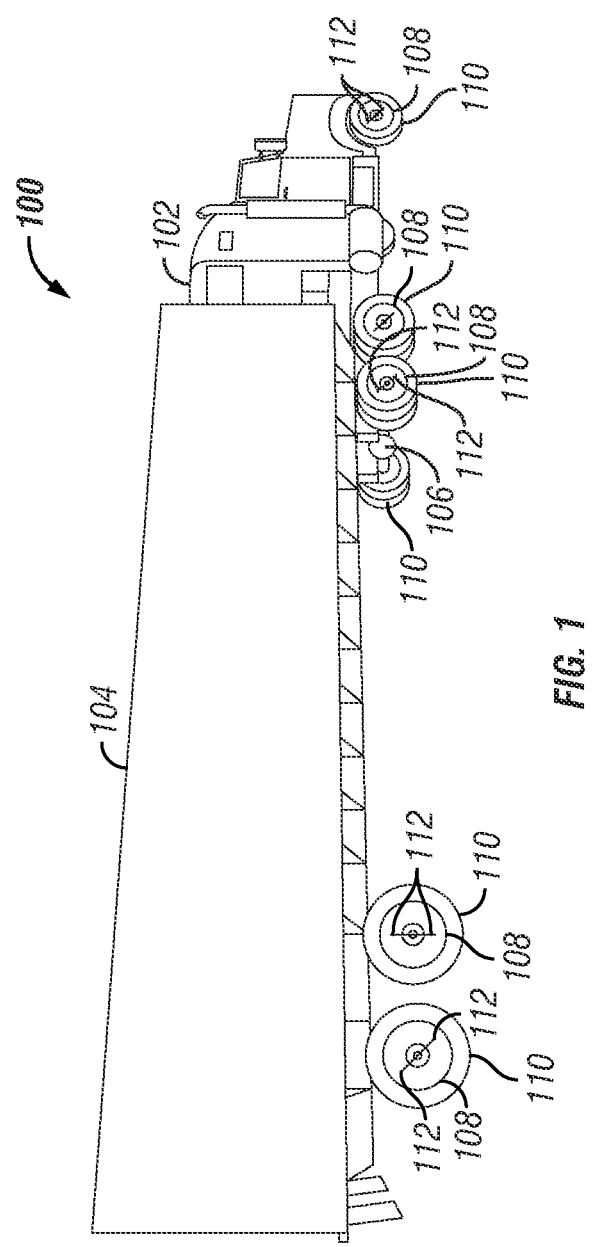
FIG. 1 illustrates one embodiment of a vehicle having an automatic tire inflation system.

As may be seen in FIG. 1, a vehicle 100 may comprise a truck 102 and a trailer 104. The truck 102 may include one or more drive axles 106 as part of the vehicle's powertrain. The truck 102 may further include a steer axle (not shown in detail) having pivotable spindles that may provide steering capability for the vehicle 100. The trailer 104 may include one or more fixed axles (not shown). Each axle may have one or more wheels 108 mounted thereto. A pneumatic tire 110 may be mounted to each wheel 108.

Figure 2:
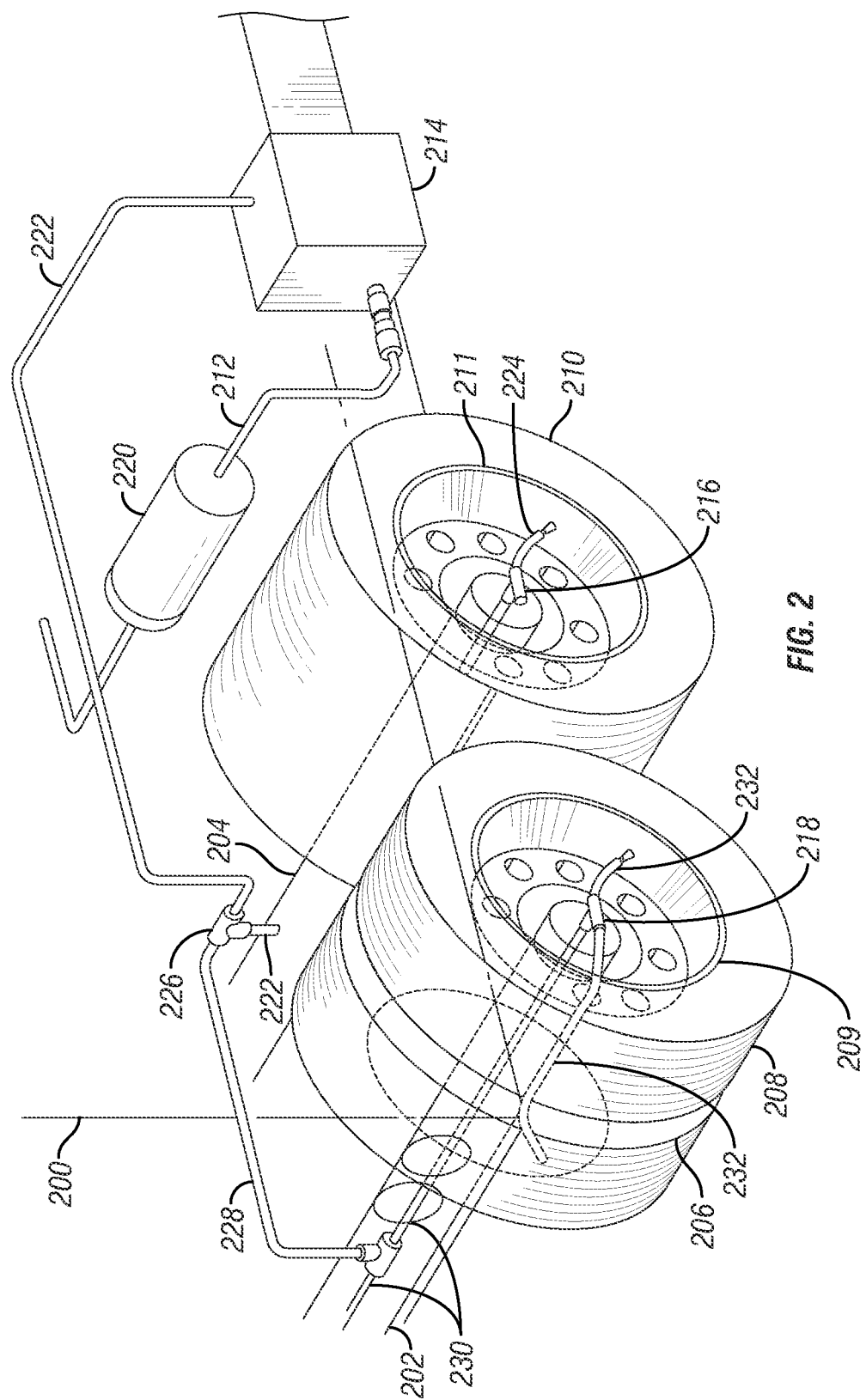
FIG. 2 illustrates the automatic tire inflation system of FIG. 1 in more detail

The vehicle 100 may be provided with an automatic tire inflation system (such as is shown in FIG. 2) that uses pressurized air from the vehicle's air brake system or some other source of pressurized air to maintain the tires at a desired air pressure. The automatic tire inflation system may be used to control air pressure in one or more of the tires 110 mounted to the steer (not shown), drive 106 and trailer axles (not shown). The automatic tire inflation system may include one or more air hoses 112 in fluid communication with each tire 110 for communicating air from the air pressure source to and from one or more of the tires 110.

FIG. 2 alumina s in more detail multiple embodiments of an automatic tire inflation system for trailer tires. A trailer 200 may include two axles 202 and 204. Some trailers may have dual tires 206 and 208 mounted at each end of the axles, as may be seen with respect to axle 202. Other trailers may have one wide-base tire 210 mounted at each end of the axles, as may be seen with respect to axle 204. The automatic tire inflation system may generally include a pressure regulator 214 and one or more rotary air connections or rotary unions 216 and 218 mounted in or near the axle ends as described in more detail below. The pressure regulator 214 may receive pressurized air from an air pressure source 220 through a conduit 212. The air pressure source 220 may comprise, for example, a vehicle air brake system air supply, or a step-up or booster pump. The pressure regulator 214 may control or reduce the air pressure from the air pressure source 220 to an air pressure level suitable for inflating the tires 206, 208, 210, such as 110 psi. Pressurized air may flow from the pressure regulator 214 through conduit 222 to the axles 202 and 204.

The axles 202 and 204 may be wholly or partially solid or hollow, and may be configured in a variety of ways. For illustration purposes only, axles 202 and 204 are hollow. For example, in sonic embodiments, an axle my comprise a solid beam having a spindle attached to each end (not shown). The axle spindles may be configured to allow mounting of wheel bearings upon which a hub may be rotatably mounted (not shown). In other embodiments, an axle may comprise a hollow tube having a spindle attached to each end. The spindles may be hollow, resulting in a hollow axle that is open at each end, as may be seen in the embodiment of FIG. 3A. Alternatively, the spindles may be wholly or partially solid, resulting in a hollow axle that is closed at each end, as may be seen in the embodiment of FIG. 3B.

As may be seen in a cross-sectional view of the embodiment of FIG. 3A, a hollow spindle 300 may be attached to a hollow tube (not shown) to form a hollow axle. A wheel end assembly may be mounted to the hollow spindle 300. The wheel end assembly may include wheel bearings 302 and 304 and a hub 306 mounted to the wheel bearings 302 and 304 to allow rotation of the hub 306 about the spindle 300. The wheel bearings 302 and 304 may be retained on the hollow spindle 300 by one or more spindle nuts 308, which may be separated by a washer 310. The hub 306 may have threaded bolt holes 312 to allow a hubcap (not shown) to be mounted to the hub 306 so as to shield the wheel bearings 302 and 304 from contamination. A bearing seal 314 may also be provided against the inner wheel bearing 302 to seal the inner side of the wheel end assembly from contamination. The open end 316 may be sealed so as to allow the hollow axle 300 to hold pressurized air and to support air conduits or rotary air connections (or components thereof), for example, with a plug or cap disclosed in one of U.S. Pat. Nos. 5,584,949, 5,769,979, 6,131,631, 6,394,556, and 6,938,658. The open end 316 may also be provided with a plug or cap that may serve more to support air conduits or rotary air connections (or components thereof) than to seal the hollow axle 300 to hold pressurized air, such as a plug or cap disclosed in one of U.S. Pat. Nos. 6,325,124 and 7,273,082.

As may be seen in a cross-sectional view of the embodiment of FIG. 3B, a close-ended or solid spindle 350 may be attached to a hollow tube (not shown) to form a hollow axle. A wheel end assembly may be mounted to the solid spindle 350. The wheel end assembly may include wheel bearings 352 and 354 and a hub 356 mounted to the wheel bearings 352 and 354 to allow rotation of the hub 356 about the spindle 350. The wheel bearings 352 and 354 may be retained on the solid spindle 350 by one or more spindle nuts 358, which may be separated by a washer 360. The hub 356 may have threaded bolt holes 362 to allow a hubcap (not shown) to be mounted to the hub 356 so as to shield the wheel bearings 352 and 354 from contamination. A bearing seal 364 may also be provided against the inner wheel bearing 352 to seal the inner side of the wheel end assembly from contamination. In this embodiment, the solid spindle 350 has a closed end 366 that seals the hollow axle.

Returning to the embodiments of FIG. 2, axles 202 and 204 may be hollow sealed axles. In one embodiment, axle 204 may be hollow and may be sealed to serve as a conduit for pressurized air. The air conduit 222 may be sealingly connected to the axle 204 to allow pressurized air to flow from the pressure regulator 214 to the axle 204. The pressurized air may flow through the axle 204 to a rotary air connection 216 mounted in or near the spindle end as described in more detail below. An air hose 224 may be connected to the rotary air connection 216 to the valve stem (not shown) of the wheel 209 to which the tire 210 is mounted, thus allowing pressurized air to flow to and from the tire 210.

In some embodiments, the air conduit 222 may be sealingly connected to a tee 226 to allow pressurized air to flow both to axle 204 and to axle 202. An air conduit 228 may allow pressurized air to flow from the tee 226 to a conduit 230 disposed in axle 202. Axle 202 may carry an air conduit 230 to communicate pressurized air to rotary air connection 218, such as is disclosed in U.S. Pat. Nos. 6,325,124 and 7,273,082. Air hoses 232 may connect the rotary air connection 218 to the valve stems of the wheels 211 to which tires 206 and 208 are mounted, thus allowing pressurized air to flow to and from the tires 206 and 208. In other embodiments, if the axle 202 is solid, then a channel may be bored in axle 202 to permit positioning of all or part of conduit 230 inside the axle 202.

Figure 4A:
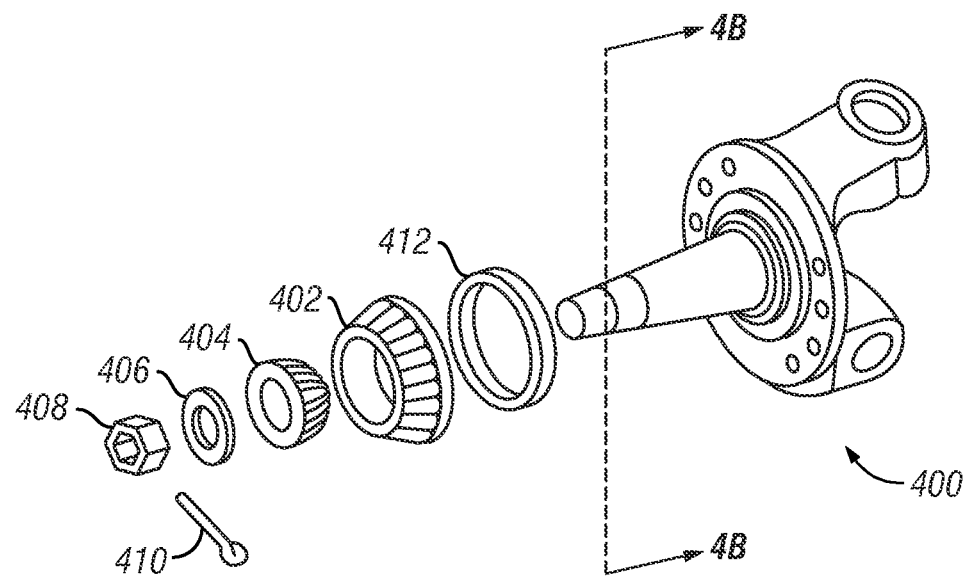
FIGS. 4A and 4B illustrate an embodiment of a steer axle.
Figure 4B:
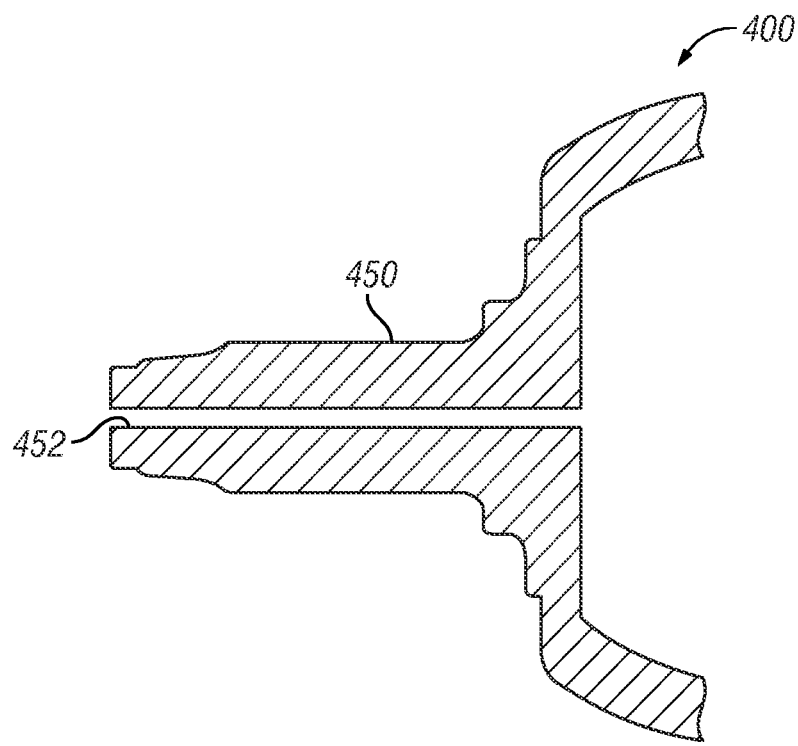

As noted above, automatic tire inflation systems may be used for steer axles, as well. Referring now to FIGS. 4A and 4B, a wheel end assembly may be mounted to a steer axle spindle 400. The wheel end assembly may include wheel bearings 402 and 404, and a hub (not shown) mounted to the wheel bearings 402 and 404 to allow rotation of the hub about the spindle 400. The wheel bearings 402 and 404 may be retained on the steer axle spindle 400 by one or more spindle nuts 408, which may be seated against a washer 406. A cotter pin 410 may be inserted into the steer axle spindle 400 to ensure that the spindle nut 408 does not loosen on the steer axle spindle 400. A bearing seal 412 may also be provided against the inner wheel bearing 402 to seal the wheel bearing 402 and 404 from contamination. In this embodiment, the spindle 400 may be solid. In some embodiments, such as may be seen in the embodiment of FIG. 4B, a channel 452 may be bored in the spindle 450 along the axis of tire rotation. An air conduit may run from an automatic tire inflation system pressure regulator through the channel 452 to a rotary air connection (not shown) that may be mounted in or near the end of the steer axle spindle 400. In other embodiments, the channel 452 may be sealed at each end to serve as a pressurized air conduit much like the seated hollow axle 204 discussed above.

Similarly, automatic tire inflation systems may be used for drive axles (not shown), and air conduits or channels may be provided in the drive axles to allow air flow from a pressure regulator 214 to a rotary air connection, for example as disclosed in U.S. Pat. Nos. 5,377,736 and 7,690,412. In yet other embodiments, again with reference to FIG. 2, air conduits (not shown) may run from the pressure regulator 214 along the outside of the vehicle trailer 200, and connect to the rotary air connections 216 and 218. Thus, an automatic tire inflation system may be adapted to work with a variety of axles, whether solid or hollow, sealed or unsealed, or fixed, drive or steer.

Figure 5:
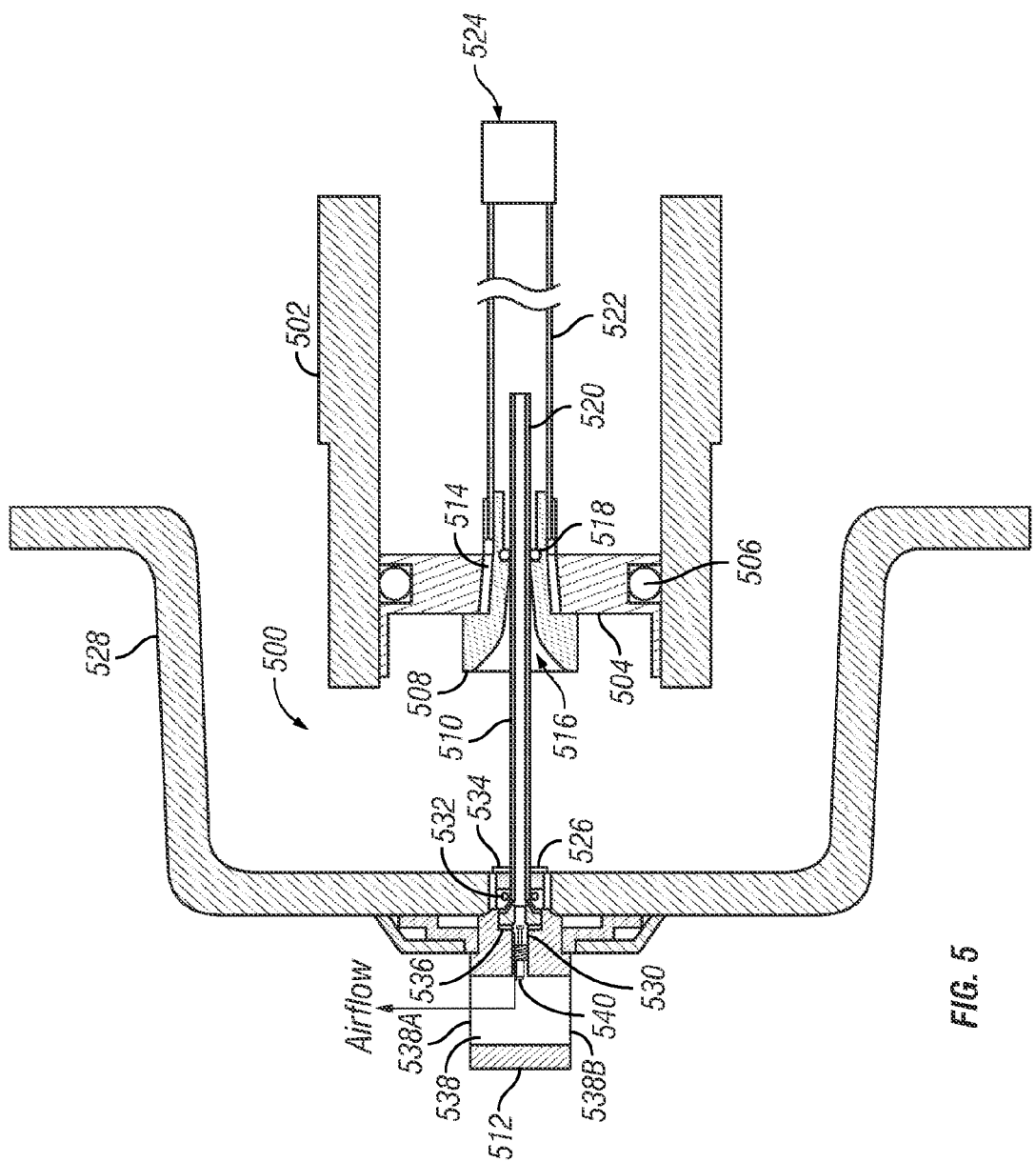
FIG. 5 illustrates one embodiment of a rotary air connection having a central valve.

Rotary air connections may be provided in a variety of configurations. FIG. 5 illustrates one embodiment of a rotary air connection or rotary union 500, such as that disclosed U.S. Pat. No. 6,698,482. As may be seen in FIG. 5, a hollow axle 502 may be sealed at an end with a plug 504 having a seal 506, such as that disclosed in U.S. Pat. No. 6,131,631, if the axle 502 is to be used as a pressurized air conduit. In other embodiments, a non-sealing plug (not shown) may be positioned in the axle 502 to allow mounting of a rotary air connection 500 along the central axis of the axle 502. In embodiments in which the axle 502 will not serve as a pressurized air conduit, an air conduit (not shown) may be positioned within the axle 502 to supply pressurized air to rotary air connection 500. In yet other embodiments, the axle 502 may be a drive axle, a steer axle (such as that of FIG. 4), or a solid axle (such as that of FIG. 3B) having a channel adapted to receive a rotary air connection 500.

In the embodiment of FIG. 5, the rotary air connection 500 may comprise a stator 508, a rotatable tube 510 and a rotatable tee-body 512. The stator 508 may be mounted in the plug 504, such as by threaded attachment 514. If the axle 502 is to be used as a pressurized air conduit, then stator 508 may be sealingly mounted in the plug 504. In other embodiments, the stator 508 may be mounted directly in a channel provided in an axle such as a steer. Stator 508 may comprise a stationary portion of the rotary air connection 500. Stator 508 may further comprise a channel 516 in which the rotatable tube 510 may be positioned, and a first seal 518, such as an o-ring or lip seal, may encircle the channel 516 and sealingly engage a first end 520 of the rotatable tithe 510. The first seal 518 may allow the rotatable tube 510 to rotate pivot, and translate axially relative to the stator 508, yet substantially prevent pressurized air from passing between the stator 508 and rotatable tube 510 into the space inside the hubcap 528. In some embodiments, the stator 508 may further comprise a shielding tube 522 and fitter 524 that may substantially prevent debris from inside the axle 502 to contaminate the rotary air connection 500. Thus, pressurized air in the axle 502 may flow through the axle 502, through the filter 524 and shielding tube 522, and into the rotatable tube 510. In embodiments in which the axle 502 is unsealed, an air conduit (not shown) may be positioned within the axle 502 and sealingly connected to the stator 508 without using a shielding tube 522 or filter 524.

A second end 526 of the rotatable tube 510 may be positioned in the tee body 512. The tee body 512 may be mounted to the hubcap 528, which may rotate with a vehicle tire (not shown). Thus, the tee body 512 may rotate with the hubcap 528. The tee body 512 may further comprise a channel 530 in which a second end 526 of rotatable tube 510 may be disposed, and a second seal 532, such as an o-ring or lip seal, may encircle the central channel 530 and sealingly engage the second end 526 of the rotatable tube 510. One or both of the tee body 512 and tube 510 may comprise a rotatable portion of the rotary air connection 500. The second seal 532 may allow the rotatable tube 510 to rotate pivot, and translate axially relative to the tee body 512, yet substantially prevent pressurized air from passing between the tee body 512 and rotatable tube 510 into the space inside the hubcap 528. The second end 526 of the rotatable tube 510 may be held in the tee body 512 by a cap 534, and may butt against a bearing 536. The channel 530 may be in fluid communication with a tee channel 538, to which one or more air hoses (not shown) may be connected for communicating air to and from the vehicle tires. The tee channel 538 may be oriented substantially perpendicularly or at some other suitable angle to the central channel 530. Thus, pressurized air may flow from the axle 502 through the rotatable tube 510, and from the rotatable tube 510 through the channel 530 to the tee-channel 538. The rotatable tube 510 may be rigid or flexible, or comprise one or more rigid or flexible components to accommodate misalignment of wheel (not shown) and axle 502 with respect to the axis of wheel rotation and central axis of the axle 502. One or more of the tee body channel 530, tube 510 and stator channel 516 may from a central channel in the rotary union 500.

The rotary air connection 500 may be improved by positioning a one-way check valve 540 within the channel 530 so as to allow air to flow from the axle 502 through the tee channel 538 to the vehicle tires, but not from the vehicle tires back through check valve 540 in the axle 502. If a tire is underinflated, e.g., has an air pressure tower than that of air provided by the automatic tire inflation system's air pressure source, air may flow from the axle 502, into the rotary air connection 500, through the check valve 540 and out the tee-channel 538 to the vehicle tires until the tire pressure increases to substantially the pressure allowed by the pressure regulator. As the pressure in the tires reaches the pressure of the air source, the check valve 540 may close and remain closed until the tire pressure drops again such that the air pressure imbalance opens the check valve 540. However, if the axle 502 becomes depressurized or the rotary air connection 500 fails to receive pressurized air, the valve 540 will close or remain closed to prevent air in the vehicle tires (not shown) from flowing back through the rotary air connection 500 and resulting in deflated tires. In other embodiments, the check valve 540 may be positioned within the stator channel 516, rotatable tube 510 or shielding tube 522. Thus, the rotary air connection 500 may comprise a check valve 540 disposed at a variety of positions within a central channel of the rotary air connection 500, whether in the tee body 512, stator 508 or in the rotatable tube 510, or in the shielding tube 522.

In some embodiments, the tee body 512 may have an air hose (not shown) connected to each end 538A and 538B the tee channel 538 so as to allow fluid communication of the rotary air connection 500 with the vehicle tires (not shown). Alternatively, for truck trailers having a single wide tire in place of dual tires, as illustrated in FIG. 2, a single air hose may be used to connect the single-wide tire to one of the ends 538A or 538B of the tee channel 538. In such a case, the other of the ends 538A or 538B of the tee channel 538 may be sealed, such as with a plug, or a pressure relief valve (not shown) may be sealingly connected to that other end, or a wired or wireless tire pressure monitoring sensor known to those in the art (not shown) may be sealingly connected to that other end, or an analog or digital tire pressure gauge (not shown) may be sealingly connected to that other end. Alternatively, for single-wide tire applications, the tee channel 538 may be provided with only an end 538A or 538B. In other embodiments, such as that illustrated in FIG. 6, for dual-tire applications requiring that air hoses (not shown) be attached to ends 638A and 638B of the tee channel 638, a port 639 may be provided in tee body 612 in fluid communication with the tee channel 638 so as to allow sealing connection of a pressure relief valve (not shown), wireless tire pressure and/or temperature monitoring sensor (not shown), or analog or digital tire pressure gauge (not shown) to the port 639. For example, a tire pressure and/or temperature monitoring sensor may include a SMARTIRE® / SMARTWAVE® tire pressure monitoring system (TPMS) wireless tire sensor made by Bendix Commercial Vehicle Systems. The port 639, tee channel 638 and tee channel ends 638A and 638B may be oriented in any number of suitable ways, for example, so as to balance the mass of various attachments, or to accommodate a variety of attachment and hose shapes and sizes.

Figure 6:
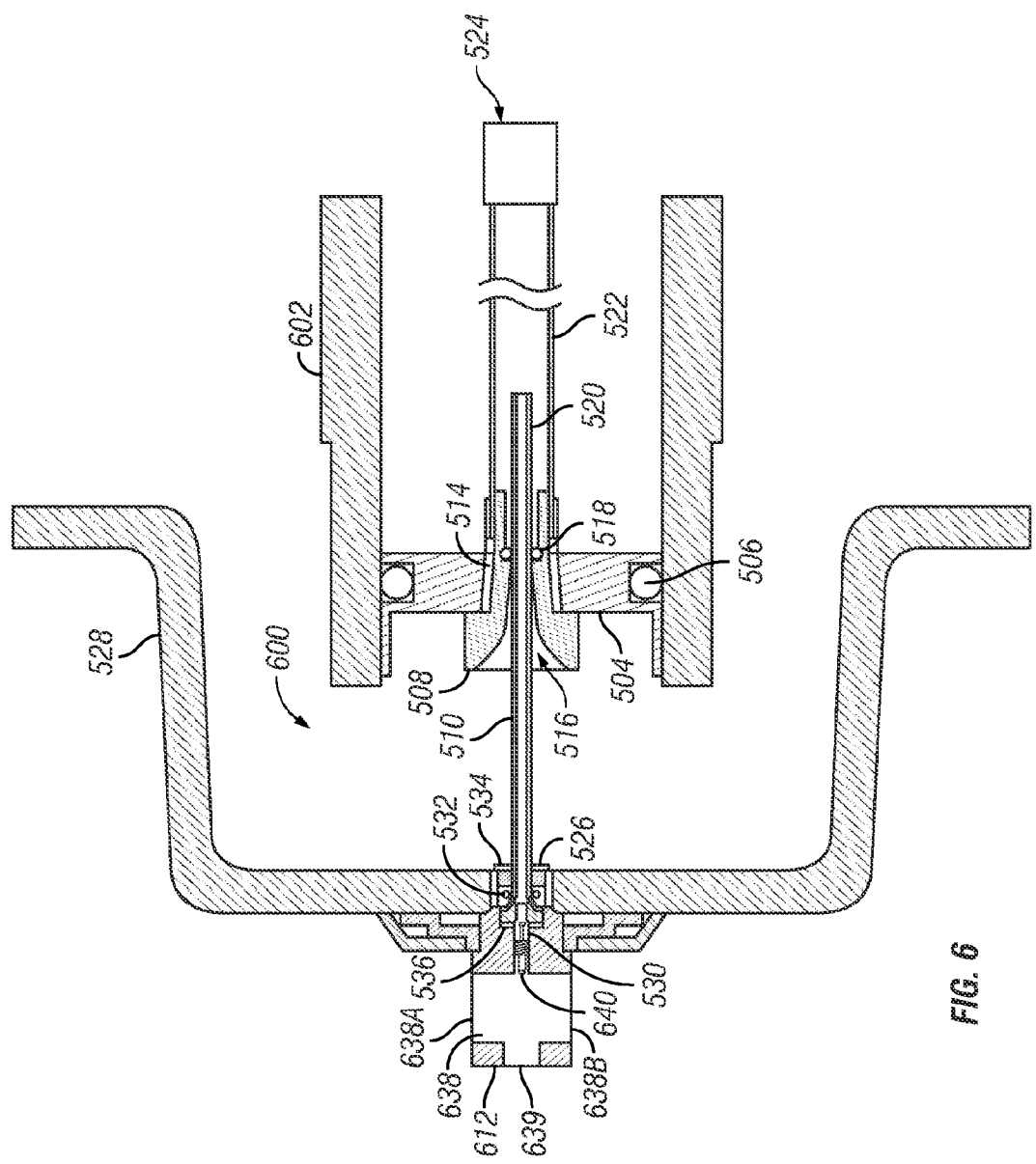
FIG. 6 illustrates another embodiment of a rotary air connection having a central valve

Referring now to FIG. 6, which may include elements from the embodiments of FIG. 5, the check valve 640 (as with the check valve described in other embodiments herein) may be a normally one-way valve, such as a SCHRADER® valve commonly found in tire valve stems, or some other suitable one-way valve. The check valve 640 may allow air to flow in one direction, and may in some embodiments be provided with a manual or electronic mechanism to fully open the valve 640 and allow air to flow in two directions. Thus, when the automatic tire inflation system is deactivated, or if the regulator fails or some damage occurs to air lines providing air to the axle 602 or rotary air connection 600, then the vehicle tires will not deflate. Similarly, if one or more tires become overpressurized, such as may occur when one side of a truck is exposed to the sun, the excess tire pressure may not result in air flowing back into axle 602 and increasing tire pressure in tires on the other end of the axle 602.

Figure 7:
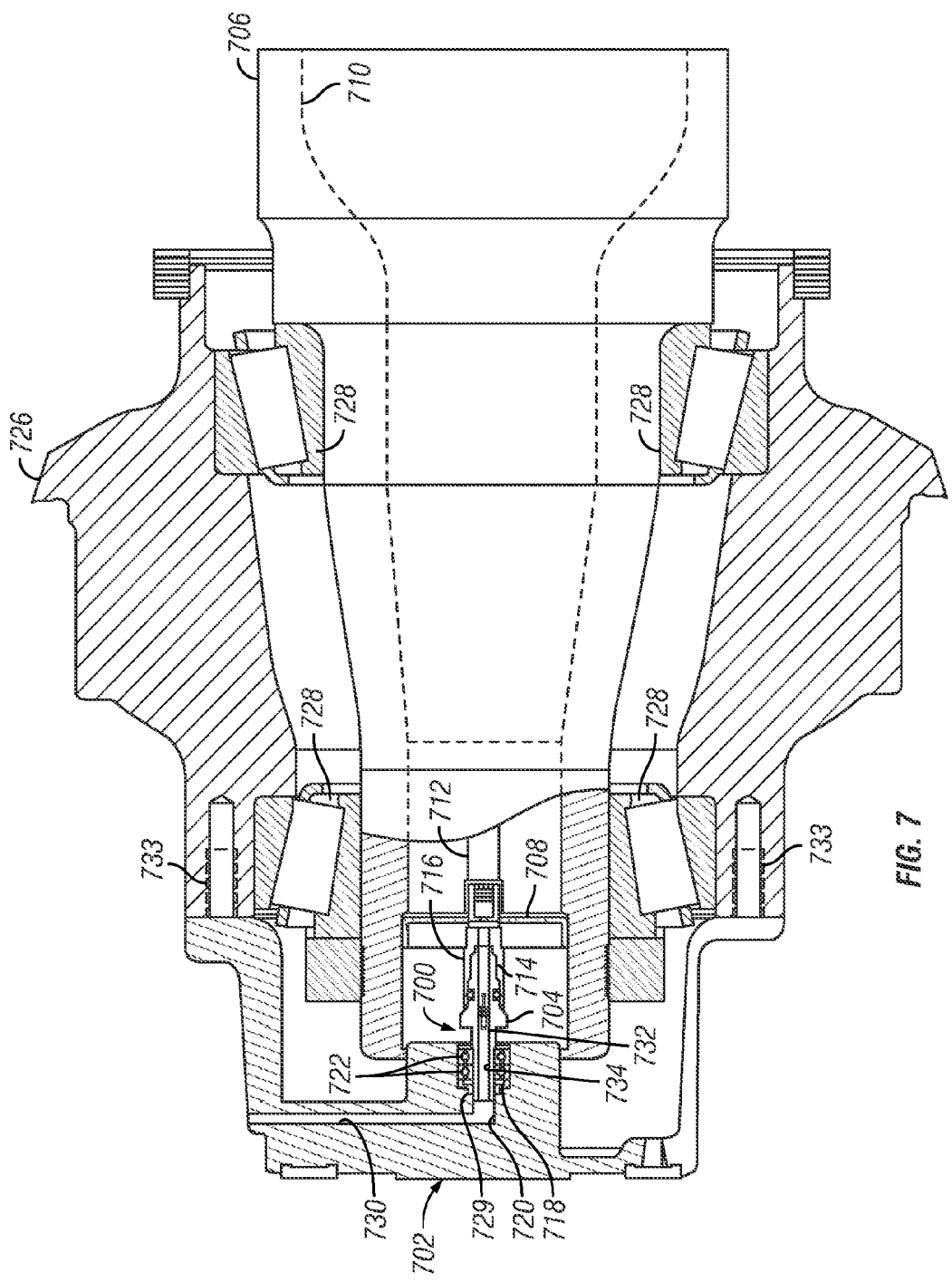
FIG. 7 illustrates yet another embodiment of a rotary air connection having a central valve.

FIG. 7 illustrates another embodiment of a rotary air connection 700 having a one-way valve 732. In FIG. 7, the rotary air connection or rotary union 700 may be integrated into a hub cap 702, such as is disclosed in U.S. Pub. App. No. 2009/0283190, and may comprise a shaft 704 having a channel 734, and a hubcap 702 rotatable about the shaft 704. The shaft 704 may comprise a stationary portion of the rotary air connection 700, and the hubcap 702 may comprise a rotatable portion thereof. In the embodiment of FIG. 7, a hollow axle 706 may have a plug 708 press-fit into the axle bore 710. An air conduit 712 may be positioned in the axle bore 710 and maybe sealingly connected to a first end 714 of the shaft 704 via air conduit connector 716. In the embodiment of FIG. 7, the shaft 704 may be threadably attachable to the air conduit connector 716 to allow ret oval of the rotary air connection 700 from the air conduit 712. A second end 718 of the shaft 704 may be disposed in a channel 720 of the hubcap 702 and may be rotatably mounted in the channel 720 using bearings 722. The bearings 722 and shaft 704 may be retained in the hubcap 702 by use of snap rings, lock nut, friction fit, or some other means known in the art. A seal 724, such as an o-ring or lip seal, may encircle the channel 720 and sealingly engage the second end 718 of the shaft 704. The hubcap 702 may be mounted to a hub 726 by, for example, one or more bolts 733. The hub 726 may be mounted on bearings 728 to the axle 706 for rotation thereon. The bearings 728 may allow the hubcap 702 to rotate about the shaft 704 as the hub 726 rotates about the axle 706. In other embodiments, the shaft 704 may be any suitable shape and need not be the shape portrayed in FIG. 7. One or more of the channel 734, channel 720, air conduit connection 716 and air conduit may from central channel of the rotary union 700.

One or more tee channels 730 may be provided in the hubcap in fluid communication with the channel 720. The tee channel 730 may be oriented substantially perpendicularly or at any suitable angle to the central channel 720. An air hose (not shown) may connect the tee-channel to a vehicle tire (not shown). Thus, pressurized air may flow through the air conduit 712, through the rotary air connect on 700, and out to the tires through the tee channel 730.

The rotary air connection 700 may be improved by positioning a one-way check valve 732 within the channel 734 of the shaft 704 so as to allow air to flow from the air conduit 712 through the tee channel 730 to the vehicle tires (not shown), but not from the vehicle tires back through check valve 732 in the channel 734. If a tire is underinflated, i.e., has an air pressure tower than that of air provided by the automatic tire inflation system's air pressure source, air may flow from the air conduit 712, into the rotary air connection 700, through the check valve 732 and out the tee-channel 720 to the vehicle tires until the tire pressure increases to substantially the pressure allowed by the pressure regulator. As the pressure in the tires reaches the pressure of the air source, the check valve 732 may close and remain closed until the tire pressure drops sufficiently that the air imbalance opens the check valve 732. However, if the air conduit 712 becomes depressurized or the rotary air connection 700 fails to receive pressurized air, the check valve 732 will close or remain closed to prevent air in the vehicle tires from flowing back through the rotary air connection 700 and resulting in deflated tires. In other embodiments, the check valve 732 may be positioned within the air conduit connector 716 or air conduit 712. In yet other embodiments, the valve 732 may be positioned within the channel 720 adjacent the tee channel 730. Thus, the rotary air connection 700 may comprise a valve disposed at a variety of positions within a central channel of the rotary air connection 700, whether in the shaft channel 734 or in the channel 720 of the hubcap 702 or elsewhere in the central channel.

Figure 8:
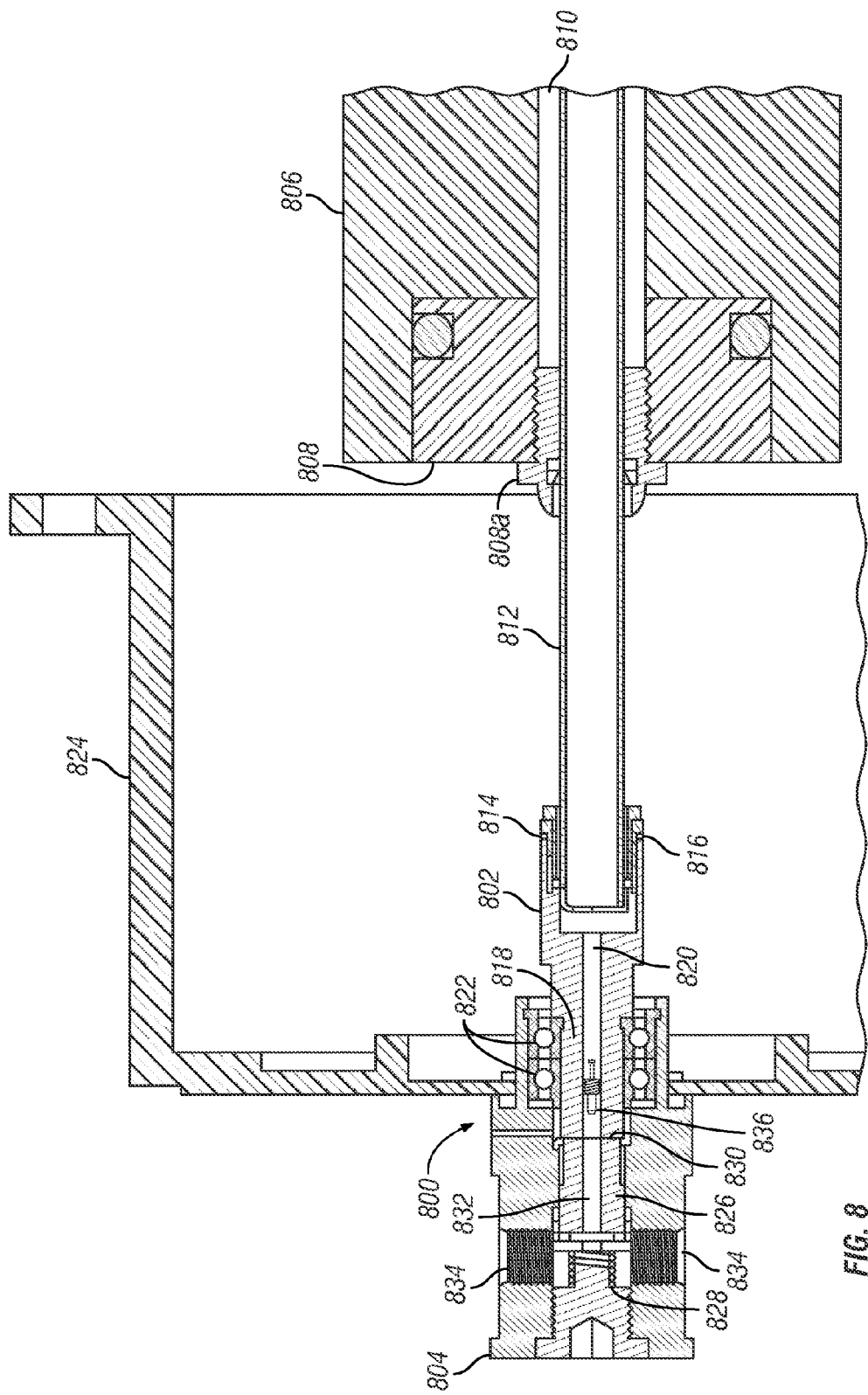
FIG. 8 illustrates a further embodiment of a rotary air connection having a central valve.

FIG. 8 illustrates another embodiment of a rotary air connection having a one-way valve. In FIG. 8, the rotary air connection or rotary union 800 may comprise a shaft 802 and a graphic element 826 disposed within a housing 804 rotatable about the shaft 802, such as that disclosed in U.S. Pat. No. 6,105,645. The shaft 802 may comprise a stationary portion of the rotary air connection 800. In the embodiment of FIG. 8, a hollow axle 806 may have a plug 808 sealing the axle bore 810. An air conduit 812 may be positioned in the axle bore 810 and may extend through the plug 808, which may have a fitting 808a to secure the air conduit 812 along the central axis of the axle 806. The air conduit 812 may sealingly connect to a first end 814 of the shaft 802 via air conduit connector 816. The shaft 802 may have a channel 820 in fluid communication with the air conduit 812. A second end 818 of the shaft 802 may be disposed in the housing 804. The second end 818 of the shaft 802 may be rotatably mounted in the housing 804 using bearings 822. The housing 804 may be mounted to a hubcap 824 for rotation therewith.

The housing 804 may contain a graphite element 826 that may be urged by a spring 828 against the second end 818 of the shaft 802 to form a face seal 830. One or both of the housing 804 and graphic element 826 may comprise a rotatable portion of the rotary air connection 800. The graphite element 826 may have a channel 832 in fluid communication with the central channel 820 of the shaft 802. A tee-channel 834 may be provided in the housing 804 in fluid communication with the channel 832 of the graphite element 826. The tee channel 834 may be oriented substantially perpendicularly or at a suitable angle to the channel 832 of the graphite element 826. One or more air hoses (not shown) may connect the tee-channel 834 to one or more vehicle tires (not shown). Thus, pressurized air may flow through the air conduit 812, through the rotary air connection 800, and out to the tires through the tee channel 834. The channel 832, channel 820 and air conduit 812 may comprise a central channel of the rotary air connection 800.

The rotary air connection 800 may be improved by positioning a one-way check valve 836 within the channel 820 of the shaft 802 so as to allow air to flow from the air conduit 812 through the tee channel 834 to the vehicle tires, but not from the vehicle tires back through valve 836 in the channel 820. If a tire is underinflated, i.e., has an air pressure lower than that of air provided by the automatic tire inflation system's air pressure source, air may flow from the air conduit 812, into the rotary air connection 800, through the valve 836 and out the tee-channel 834 to the vehicle tires until the tire pressure increases to substantially the pressure allowed by the pressure regulator. As the pressure in the tires reaches the pressure of the air source, the valve 836 may close and remain closed until the tire pressure drops again. However, if the air conduit 812 becomes depressurized or the rotary air connection 800 fails to receive pressurized air, the valve 836 will close or remain closed to prevent air in the vehicle tires from flowing back through the rotary air connection 800 and resulting in deflated tires. In other embodiments, the valve 836 may be positioned within a sleeve (not shown) in the central bore 832 of the graphite element 826 or within air conduit 812. Thus, the rotary air connection 800 may comprise a check valve disposed at a variety of positions within a central channel of the rotary air connection 800, whether in the shaft 802 or in a rotatable housing 804 or elsewhere in the central channel.

Figure 9:
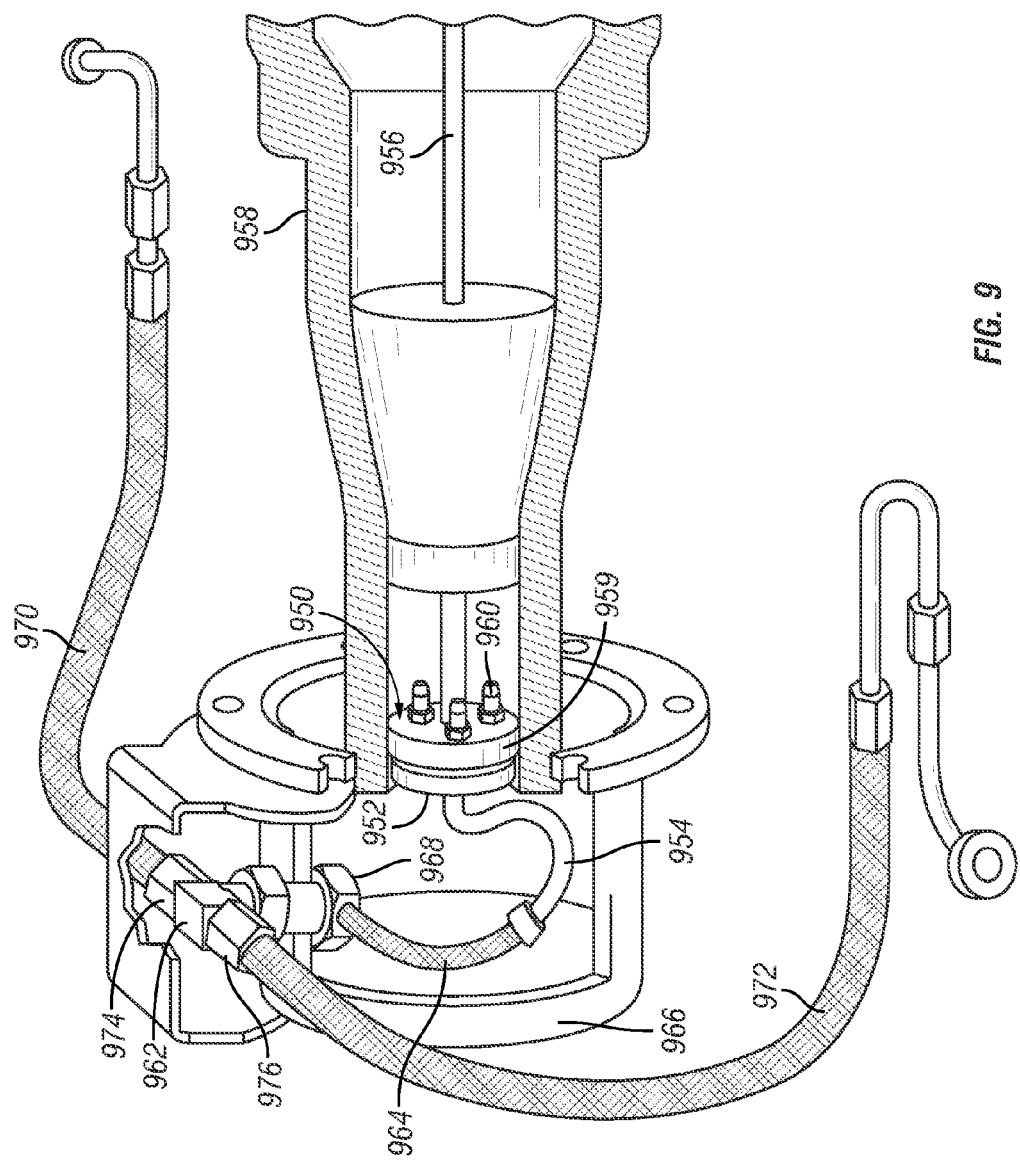
FIG. 9 illustrates a further embodiment of a rotary air connection having a central valve.

FIG. 9 illustrates yet a other embodiment of a rotary air connection having a valve. In the embodiment of FIG. 9, a rotary air connection 950 comprises a stator 952 and a tube 954. The stator 952 may comprise a stationary portion of the rotary air connection 950, and the tube 954 may comprise a rotatable portion thereof. An air conduit 956 may be disposed within a hollow axle 958, and may be sealingly connected to the stator 952. The stator 952 may be mounted in a plug 959 that is press-fit into the axle 958. The stator 952 may be mounted the plug 959 by means of three bolts 960. Alternatively, the stator 952 may be press-fit directly into the axle 958. The tube 954 may comprise a tee body 962. The tube 954 may include a flexible portion 964 to accommodate off-center mounting of the tee body 962 to a hub cap 966 mounted to a hub (not shown). The tube 954 may include a fitting 968 adapted for removable attachment of the flexible portion 964 of the tube 954 to the tee body 962. A first air hose 970 and a second air hose 972 may connect the tee body 962 to wheel valve stems (not shown) so as to allow fluid communication of air from air conduit 956 through the rotary air connection 950 to the air hoses 970 and 972 so as to inflate the vehicle tires (not shown). The air hoses 970 and 972 may be removably attachable to the tee body 962 by hose nuts 974 and 976.

Figure 10:
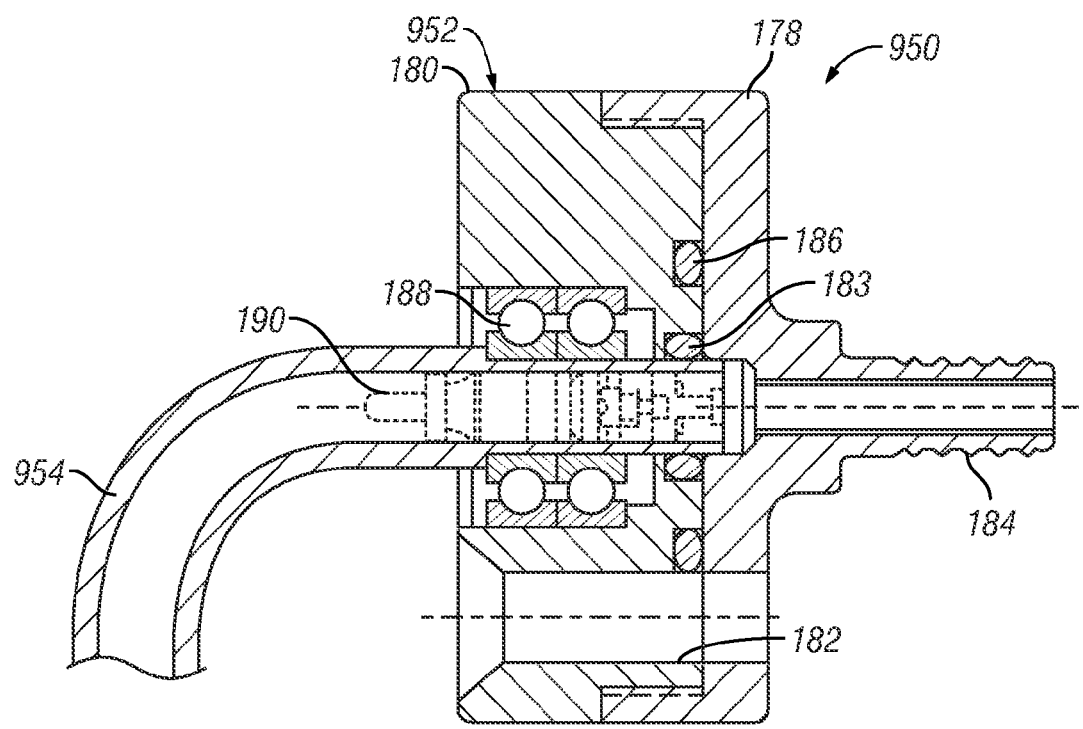
FIG. 10 illustrates the rotary air connection of FIG. 9 in more detail.

FIG. 10 further illustrates the rotary air connection 950 of FIG. 9 in more detail. As may be seen in the embodiment of FIG. 10, the stator 952 may include abuse 178 and a cap 180 that may be held together with bolts 960 (shown in FIG. 9) insertable through bolt holes 182. The base 178 may comprise a barb 184 that may be inserted into the air conduit 956 (shown in FIG. 9) to create a sealed connection between the stator 950 and the air conduit 956. An o-ring 186 or other suitable seal may be disposed between the base 178 and cap 180 to substantially prevent pressurized air from leaking between the base 178 and cap 180. The tube 954 may be rotatably mounted in the stator 952 in bearings 188. Thus, with reference to FIGS. 9 and 10, the bearings 188 allow the tube 954 to rotate with respect to the stator 182 as the hub (not shown) turns. An o-ring 183 or other seal may encircle to tube 954 to provide a sealed connection between the tube 954 and stator 952.

The rotary connection 950 may be improved by positioning a one-way check valve 190 within the tube 954 so as to allow air to flow from the air conduit 956 through the rotary air connection 950 to the air hoses 970 and 972 and so on to the vehicle tires, but not from the vehicle tires back through valve 190 to the air conduit 956. If a tire is underinflated, i.e., has an air pressure lower than that of air provided by the automatic tire inflation system's air pressure source, air may flow from the air conduit 956, into the rotary air connection 950, through the valve 190 and out the air hoses 970 and 972 to the vehicle tires until the tire pressure increases to substantially the pressure allowed by the pressure regulator. As the pressure in the tires reaches the pressure of the air source, the valve 190 may close and remain closed until the tire pressure drops again. However, if the air conduit 956 becomes depressurized or the rotary air connection 950 fails to receive pressurized air, the valve 190 will close or remain closed to prevent air in the vehicle tires from flowing back through the rotary air connection 950 and resulting in deflated tires. In other embodiments, the valve 190 may be positioned within the stator 952, such as within the barb 184, or within the air conduit 956 to prevent air from flowing back toward the air pressure source.

Figure 11:
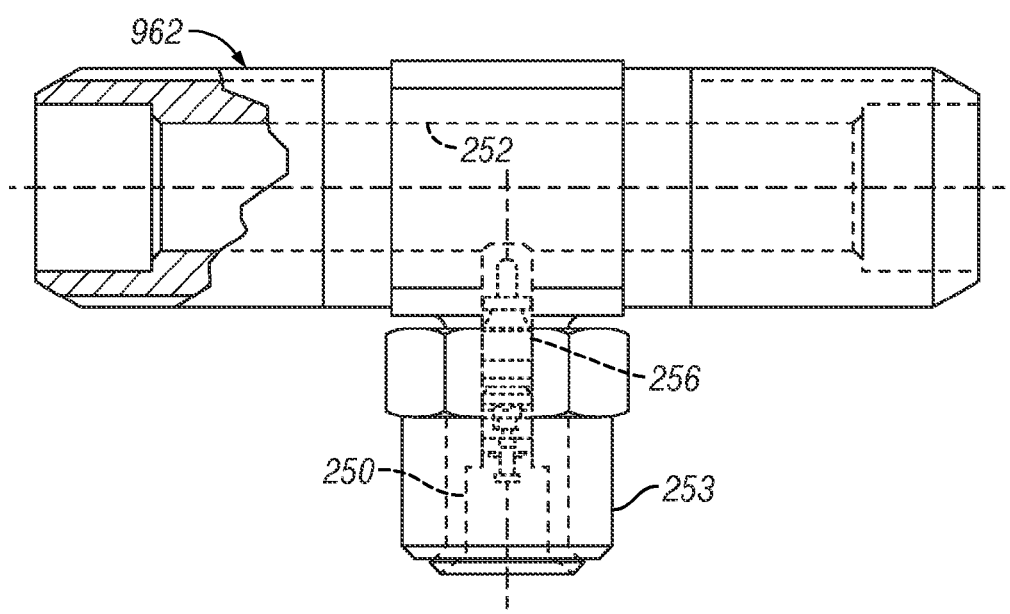
FIG. 11 illustrates the tee body of FIG. 9 in more detail.

FIG. 11 illustrates the tee body 962 of tube 954 of FIG. 9 in more detail. As may be seen in the embodiment of FIG. 11, the tee body 962 may comprise a channel 250 that allows fluid communication from the stator 952 through the tube 954 to a tee channel 252. A tee nut 253 may allow removable attachment of the tee body 962 to the fitting 968 (shown in FIG. 9) of a flexible portion 964 of the tube 954. The tee channel 252 may be oriented substantially perpendicularly or at a suitable angle to the central channel 250. The air hoses 970 and 972 (shown in FIG. 9) may connect the tee-channel 252 to vehicle tires. Thus, pressurized air may flow through the air conduit 956, through the rotary air connection 950, and out to the tires through the tee channel 252.

In alternative embodiments, the rotary air connection 950 may be improved by positioning a one-way check valve 256 within the channel 250 of the tee body 962 so as to allow air to flow from the air conduit 956 through the rotary air connection 950 to the air hoses 970 and 972 and so on to the vehicle tires (not shown), but not from the vehicle tires back through valve 256 to the air conduit 956. One or more of the tee body channel 250, tube 954, stator 952 and air conduit may from a central channel of the rotary air connection 950. Thus, the rotary air connection 950 may comprise a valve disposed at a variety of positions within a central channel of the rotary air connection 950, whether in the rotatable tube 954 or in the stator 952.

Providing a check valve in a central channel of a rotary union of an automatic tire inflation system may provide a way to prevent deflation of vehicle tires if air pressure fails upstream of the rotary union. Placement of a check valve in a central channel may substantially reduce material and manufacturing costs compared to placement of check valves in air hoses downstream of a rotary union. Also, use of a check valve as described herein may prevent overpressurization of one or more tires from adversely affecting non-over-inflated tires.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. An automatic tire inflation system comprising:
a rotary fluid connection in substantially continuously-pressurized sealed fluid communication with a fluid pressure source and continuously receiving from the fluid pressure source a pressurized fluid at a substantially constant predetermined fluid pressure for inflating a pneumatic tire, the rotary fluid connection having an axis of rotation and comprising:
a stationary portion having a first channel formed therein on the axis of rotation;
a rotatable portion rotatably coupled to the stationary portion and in continuous sealing contact with the stationary portion at a sealing interface, the rotatable portion having a second channel formed therein on the axis of rotation and in substantially sealed fluid communication with the first channel, the first channel and second channel together forming a central channel on the axis of rotation through which the pressurized fluid for inflating a pneumatic tire may flow; and
a normally-closed check valve disposed in the central channel along the axis of rotation so as to allow the pressurized fluid to flow from the fluid pressure source in one direction through the central channel toward a pneumatic tire but not in the opposite direction toward the fluid pressure source, the normally-closed check valve being directly pneumatically actuatable by the pressurized fluid at the substantially constant predetermined fluid pressure from the pressure source while the rotary fluid connection is in substantially continuously-pressurized sealed fluid communication with the fluid pressure source, the normally-closed check valve being configured to open when fluid pressure in the pneumatic tire is lower than the substantially constant predetermined fluid pressure and close when the fluid pressure in the pneumatic tire substantially equals the substantially constant predetermined fluid pressure; and
a pneumatic tire in sealed fluid communication with the rotary fluid connection such that the pressurized fluid for inflating a pneumatic tire may flow to the pneumatic tire from the rotary fluid connection.

2. The rotary fluid connection of claim 1, wherein the normally-closed check valve is disposed in one of the first channel of the stationary portion and the second channel of the rotatable portion.

3. The rotary fluid connection of claim 1 further comprising a rotatable tube, wherein the stationary portion comprises a stator having the first channel therein, and the rotatable portion comprises a tee body having the second channel therein, the stator and tee body in fluid communication through the rotatable tube, and the first channel of the stator, the rotatable tube and the second channel of the tee body together forming the central channel.

4. The rotary fluid connection of claim 3, wherein the normally-closed check valve is disposed in one of the first channel of the stator, the rotatable tube and the second channel of the tee body.

5. The rotary fluid connection of claim 1, wherein the stationary portion comprises a shaft having the first channel therein, and the rotatable portion comprises a hubcap having the second channel therein, and the first channel of the shaft and the second channel of the hubcap together forming the central channel.

6. The rotary fluid connection of claim 5, wherein the normally-closed check valve is disposed in one of the first channel of the shaft and the second channel of the hubcap.

7. The rotary fluid connection of claim 1, wherein the stationary portion comprises a shaft having the first channel therein, and the rotatable portion comprises a housing having a graphite element disposed therein, the housing and the graphite element having the second channel therein and, the graphite element being urged against the shaft to form a face seal, and the first channel of the shaft and the second channel of the housing and the graphite element together forming the central channel.

8. The rotary fluid connection of claim 7, wherein the normally-closed check valve is disposed in one of the first channel of the shaft and the second channel of the housing and graphite element.

9. The rotary fluid connection of claim 1, wherein the stationary portion comprises a stator having the first channel therein and the rotatable portion comprises a rotatable tube having a tee body together forming the second channel therein, and the first channel of the stator and the second channel of the rotatable tube and tee body together forming the central channel.

10. The rotary fluid connection of claim 9, wherein the normally-closed check valve is disposed in one of the first channel of the stator and the second channel of the rotatable tube and tee body.

11. The rotary fluid connection of claim 1, wherein the normally-closed check valve comprises an automobile tire valve.

12. The rotary system of claim 1, further comprising a pressure regulator in substantially continuously-pressurized sealed fluid communication with the air pressure source and the rotary air connection.

13. A rotary fluid connection capable of substantially continuously-pressurized sealed fluid communication with a fluid pressure source and capable of continuously receiving from the fluid pressure source a pressurized fluid at a substantially constant predetermined fluid pressure for inflating a pneumatic tire, rotary fluid connection having an axis of rotation and comprising:
a stationary portion having a first channel formed therein on the axis of rotation;
a rotatable portion rotatably coupled to the stationary portion and in continuous sealing contact with the stationary portion at a sealing interface, the rotatable portion having a second channel formed therein on the axis of rotation and in substantially sealed fluid communication with the first channel, the first channel and second channel together forming a central channel on the axis of rotation through which the pressurized fluid for inflating a pneumatic tire may flow; and
a normally-closed check valve disposed in the central channel along the axis of rotation so as to allow the pressurized fluid to flow from the fluid pressure source in one direction through the central channel toward a pneumatic tire but not in the opposite direction toward the fluid pressure source, the normally-closed check valve being directly pneumatically actuatable by the pressurized fluid at the substantially constant predetermined fluid pressure from the pressure source while the rotary fluid connection is in substantially continuously-pressurized sealed fluid communication with the fluid pressure source, the normally-closed check valve being configured to open when fluid pressure in the pneumatic tire is lower than the substantially constant predetermined fluid pressure and close when the fluid pressure in the pneumatic tire substantially equals the substantially constant predetermined fluid pressure.

14. The rotary fluid connection of claim 13, wherein the normally-closed check valve is disposed in one of the first channel of the stationary portion and the second channel of the rotatable portion.

15. The rotary fluid connection of claim 13 further comprising a rotatable tube, wherein the stationary portion comprises a stator having the first channel therein, and the rotatable portion comprises a tee body having the second channel therein, the stator and tee body in fluid communication through the rotatable tube, and the first channel of the stator, the tube and the second channel of the tee body together forming the central channel.

16. The rotary fluid connection of claim 13, wherein the stationary portion comprises a shaft having the first channel therein, and the rotatable portion comprises a hubcap having the second channel therein, and the first channel of the shaft and the second channel of the hubcap together forming the central channel.

17. The rotary fluid connection of claim 13, wherein the stationary portion comprises a shaft having the first channel therein, and the rotatable portion comprises a housing having a graphite element disposed therein, the housing and the graphite element having the second channel therein and being urged against the shaft to form a face seal, and the first channel of the shaft and the second channel of the housing and the graphite element together forming the central channel.

18. The rotary fluid connection of claim 13, wherein the stationary portion comprises a stator having the first channel therein and the rotatable portion comprises a tube having a tee body together forming the second channel therein, and the first channel of the stator and the second channel of the tube and tee body together forming the central channel.

19. The rotary fluid connection of claim 13, wherein the normally-closed check valve comprises an automobile tire valve.

* * * * *